(12) United States Patent
Zeng

(10) Patent No.: US 7,564,195 B2
(45) Date of Patent: Jul. 21, 2009

(54) CIRCUIT OF THE ELECTRONIC BALLAST WITH THE CAPABILITY OF AUTOMATIC RESTART

(75) Inventor: Haoran Zeng, Dongyang (CN)

(73) Assignee: Dongyang Tospo Lighting Co., Ltd., Dongyang, Zhejiang (CN)

( * ) Notice: Subject to any disclaimer, the term of this patent is extended or adjusted under 35 U.S.C. 154(b) by 0 days.

(21) Appl. No.: 11/898,422

(22) Filed: Sep. 12, 2007

(65) Prior Publication Data
US 2008/0061713 A1  Mar. 13, 2008

(30) Foreign Application Priority Data
Sep. 12, 2006  (CN) .......................... 2006 1 0053360

(51) Int. Cl.
*H05B 37/02* (2006.01)
(52) U.S. Cl. .................. 315/291; 315/209 R; 315/307; 315/308
(58) Field of Classification Search ............. 315/200 R, 315/291, 307, 308, 312, 326, DIG. 5, DIG. 2
See application file for complete search history.

(56) References Cited
U.S. PATENT DOCUMENTS
5,757,141 A * 5/1998 Wood .......................... 315/224
6,720,739 B2 * 4/2004 Konopka ..................... 315/225
2007/0278972 A1 * 12/2007 Lee ............................. 315/291
* cited by examiner Primary Examiner—Douglas W Owens
Assistant Examiner—Jianzi Chen
(74) Attorney, Agent, or Firm—Jacobson Holman PLLC

(57) ABSTRACT

This present invention discloses a circuit of the electronic ballast with the capability of automatic restart. It includes a rectifier circuit, a trigger circuit of automatic restart, a DC/AC convertor, an output circuit of the lamp, and a circuit of abnormal protection. Its main feature is that there is a discharge loop in the trigger circuit, so it can realize automatic restart only after changing the lamp tube or connecting the lamp pin without turning off the power source when the lamp tube is abnormal and enters into protecting condition or any of the lamp pins is in poor contact. Because the trigger recourse Vt is led out from the lamp loop, when the power source is switched on, the DC/AC convertor is triggered to start after insuring good contact between the lamp tube and the lamp holder, accordingly realizes the self-check function of the connection for the lamp tube. Furthermore, because primary side winding Ta of oscillating coil T of the present invention is connected in series between the lamp pin P1 and the common end of feed-through capacitor C4 and by-pass capacitor C6, the primary side winding Ta of oscillating coil T will disconnect the power source when the lamp is in open circuit or any of the lamp pins is in poor contact. Therefore, the circuit will not come into protecting condition despite the by-pass capacitor C6, which results in the simplification of the task program.

3 Claims, 11 Drawing Sheets

CIRCUIT OF THE ELECTRONIC BALLAST WITH THE CAPABILITY OF AUTOMATIC RESTART

FIELD OF THE INVENTION

This invention relates to the field of power electron and illuminative electron, particularly to the field of electronic ballast for the fluorescent lamp.

DESCRIPTION OF THE RELATED ART

In the application technology of the electronic ballast for the fluorescent lamp, the circuit of the electronic ballast generally comprises the circuits of rectifier, DC/AC convertor, output, abnormal protection etc. Thereinto, the part of DC/AC convertor comprises a trigger start circuit while the abnormal protection circuit is connected between the output circuit and DC/AC convertor (referring to FIG. 1).

Conventionally (referring to FIG. 2), the trigger of DC/AC convertor is generally a type of continuous trigger. However, the abnormal protection circuit mostly comprises more complicated circuits. In FIG. 2, a resistance R1, a diac D2, a capacitor C2 and a diode D1 constitute the trigger circuit; a secondary side winding of output inductance L1, a resistance R7, a diode D3, a capacitor C6, a diac D4, a capacitor C7, a resistance R8, a resistance R9, a thyristor Q4, a transistor Q3 and a resistance R1 constitute the abnormal protection circuit; a fuse F, a rectifier BD, and a capacitor C1 constitute the rectifier circuit; a transistor Q1, a transistor Q2, a resistance R2, a resistance R3, a resistance R4, a resistance R5, a resistance R6, a capacitor C3, a diode D1, and a oscillating coil T constitute the DC/AC convertor; a output inductance L1, a capacitor C5, a LAMP, and a capacitor C5 constitute the output circuit of series resonance.

We can find from the conventional technology that:
1. Because the resistance R1 of the trigger circuit is connected to the positive pole of the rectifier circuit, the capacitor C2 may be charged to the gate limited voltage of the diac D2, thus DC/AC convertor can be continuously triggered whether it is wired up or in the normal working condition, which goes against the improvement of the reliability.
2. Because the thyristor Q4 which is the main component comprising the abnormal protection circuit is connected to the positive pole of the rectifier circuit via the resistance R1, the circuit does not have the function of automatic restart after it is triggered to turn on when the fluorescent lamp tube driven by the electronic ballast leaks or it is over-voltage or reaches the end of lamp life. The lamp tube will not be lightened until the power source is restarted after it is cut off, which results in the inconvenience for the operator.
3. The abnormal protection in conventional technology is comparatively complicated, which has detrimental effects on the cost reduction and the miniaturization of the product.

SUMMARY OF THE INVENTION

The present invention is provided to solve the problems of reliability caused by the continuous trigger, high cost and miniaturization caused by the complication of the circuit in conventional technology. Accordingly, the present invention realizes the protective function of leaking, over-voltage, the life end of the lamp tube and the function of automatic restart by the development of the circuit of DC/AC convertor, to achieve the aim of enhancing the reliability, reducing cost and the volume of the product.

The new technical solution to solve the above-mentioned problems is a circuit of the electronic ballast with the capability of automatic restart, including a rectifier circuit, a trigger circuit of automatic restart, a DC/AC convertor, an output circuit of the lamp, and a circuit of abnormal protection, wherein there is a discharge loop in said trigger circuit, and the trigger recourse Vt is led out from the lamp loop, said rectifier circuit comprises a fuse F, a rectifier BD, and a filter capacitor C1; said trigger circuit of automatic restart comprises a divider resistance R10, a rectifier diode D6, a divider resistance R1, a divider resistance R6, a divider capacitor C8, a relax diode D5, a divider capacitor C2, and a diac D2; said DC/AC convertor comprises a catching diode D1, a transistor Q1, a transistor Q2, a current limiting resistance R2, a current limiting resistance R3, a feedback resistance R4, a negative feedback resistance R5, a dv/dt capacitor C3, two secondary side windings Tb and Tc of the oscillating coil T; said output circuit of the lamp comprises a output inductance L1, feed-through capacitor C4, by-pass capacitor C6, a primary side winding Ta of oscillating coil T, a resonant capacitor C5, and a thermistor PTC; said circuit of abnormal protection comprises a secondary side winding of the output inductance L1, a current limiting resistance R7, a rectifier diode D3, a delay capacitor C7, a relax resistance R8, a diac D4, and a current limiting resistance R9.

A first end of said fuse F is connected to a live wire F of a power source and a second end of the fuse is connected to a AC end of rectifier BD, a second AC end of the rectifier BD is connected to a neutral wire N of the power source; the positive pole Vdc of DC end of the rectifier BD is connected to the positive pole of the filter capacitor, the collector of transistor Q1, a first end of dv/dt capacitor C3, a first end of by-pass capacitor C6 and a pin P4 of the lamp tube; the negative pole of DC end of rectifier BD is connected to the negative pole of filter capacitor C1, a first end of divider resistance R6, the positive pole of relax diode D5, a first end of divider capacitor C2, no-dot end of the secondary side winding Tc of oscillating coil T, a first end of negative feedback resistance R5, a first end of relax resistance R8, a positive pole of delay capacitor C7 and a first end of a secondary side winding of output inductance L1; the pin P1 of the lamp tube is connected to a dot end of primary side winding Ta of oscillating coil T and a positive pole of rectifier diode D6; a negative pole of rectifier diode D6 is connected to a first end of divider resistance R1; a second end of divider resistance R1 is connected to a second end of divider resistance R6 and a first end of divider capacitor C8; a second end of divider capacitor C8 is connected to a negative pole of relax diode D5, a second end of divider capacitor C2, a first end of diac D2 and a positive pole of catching diode D1; a second end of diac D2 is connected to a base of transistor Q2, a first end of current limiting resistance R3 and a first end of current limiting resistance R9; a second end of current limiting resistance R3 is connected to a dot end of a secondary side winding Tc of oscillating coil T; a base of transistor Q1 is connected to a first end of current limiting resistance R2; a second end of current limiting resistance R2 is connected to a no-dot end of a secondary side winding Tb of oscillating coil T; a dot end of the secondary side winding Tb of oscillating coil T is connected to a negative pole of catching diode D1, a collector of transistor Q2, a second end of dv/dt capacitor C3, a first end of primary side winding of output inductance L1, and a first end of negative feedback resistance R4; a second end of negative feedback resistance R4 is connected to a emitter of transistor Q1; a emitter of transistor Q2 is connected to a second end of negative feedback resistance R5; a second end of current limiting resistance R9 is connected to a first end of diac D4; a second end of diac D4 is connected to a second end of relax resistance R8, a negative pole of delay capacitor C7 and a positive pole of rectifier diode D3; a negative pole of rectifier diode D3 is connected to a first end of current limiting resistance R7; a second end of current limiting resistance R7 is connected to a second end of secondary side winding of output inductance L1; a second end of primary side winding of output inductance L1 is connected to a first end of feed-through capacitor C4; a second end of feed-through capacitor C4 is connected to a second end of by-pass capacitor C6 and a no-dot end of primary side winding Ta of oscillating coil; a pin P2 of the lamp tube is connected to a first end of resonant capacitor C5, a first end of divider resistance R10 and PTC; a second end of resonant capacitor C5, a second end of divider resistance R10 and a second end of PTC is together connected to a pin P3 of the lamp tub.

The circuit of the electronic ballast with the capability of automatic restart of the present invention, comprises five parts which include a rectifier circuit, a perfect trigger circuit of automatic restart, a DC/AC convertor, a output circuit of the lamp, and a circuit of abnormal protection. The rectifier circuit comprising the fuse F, the rectifier BD and the filter capacitor C1 accomplishes the conversion from AC to DC. The perfect trigger circuit of automatic restart comprising the divider resistance R10, the rectifier diode D6, the divider resistance R1, the divider resistance R6, the divider capacitor C8, the relax diode D5, the divider capacitor C2 and the diac D2, wherein its trigger source is derived from a positive end Vdc of DC power source, via filament P4 and P3, divider resistance R10, filament P2 and P1, commuted into half wave by rectifier diode D6, further to divider resistance R1 and R6, finally produces DC voltage Vt between the double end of divider resistance R6. When the power source is switched on, abruptly changed DC voltage Vt is brought to bear on diac D2 via divider capacitor C8 and C2, and accomplishes the single-wave trigger to AC/DC convertor. The DC/AC convertor comprising catching diode D1, transistor Q1, transistor Q2, current limiting resistance R2, current limiting resistance R3, feedback resistance R4, negative feedback resistance R5, dv/dt capacitor C3, two secondary side windings Tb and Tc of the oscillating coil T, converts DC into high-frequency square wave source. The output circuit of the lamp comprising output inductance L1, feed-through capacitor C4, by-pass capacitor C6, primary side winding Ta of oscillating coil T, resonant capacitor C5 and thermistor PTC, forms a series resonance drive to light the fluorescence lamp. The circuit of abnormal protection comprising secondary side winding of the output inductance L1, current limiting resistance R7, rectifier diode D3, delay capacitor C7, relax resistance R8, diac D4 and current limiting resistance R9, actualizes the protection of stopping oscillation when the lamp tube leaks, overvoltage, or reach the end of life.

The present invention can also be explained in three aspects as follows:

1. In the structure of trigger circuit of present invention, the trigger source Vt is derived from the loop of the positive pole of DC and two series-wound filaments, and is finally gotten in the divider circuit composed of divider resistance R10, R1 and R6. Therefore, when the power source is switched on, the DC/AC convertor is triggered to start after insuring good contact between the lamp tube and the lamp holder, accordingly realizes the self-check function of the connection for the lamp tube.

2. Because the present invention has a discharge loop composed of divider resistance R6, divider capacitor C8 and relax diode D5, it can realize automatic restart only after changing the lamp tube or connecting the lamp pin without turning off the power source when the lamp tube is abnormal into protecting condition or any of the lamp pins is in poor contact.

3. Because the primary side winding Ta of the oscillating coil T of the present invention is connected in series between the lamp pin P1 and the common end of feed-through capacitor C4 and by-pass capacitor C6, the primary side winding Ta of oscillating coil T will disconnect the power source when the lamp is in open circuit or any of the lamp pins is in poor contact. Therefore, the circuit will not come into protecting condition despite the by-pass capacitor C6, which results in the simplification of the task program.

BRIEF DESCRIPTION OF THE DRAWINGS

The present invention shall be further described in combination with the attached drawings and practice examples.

DETAILED DESCRIPTION OF THE INVENTION

Figure 1:
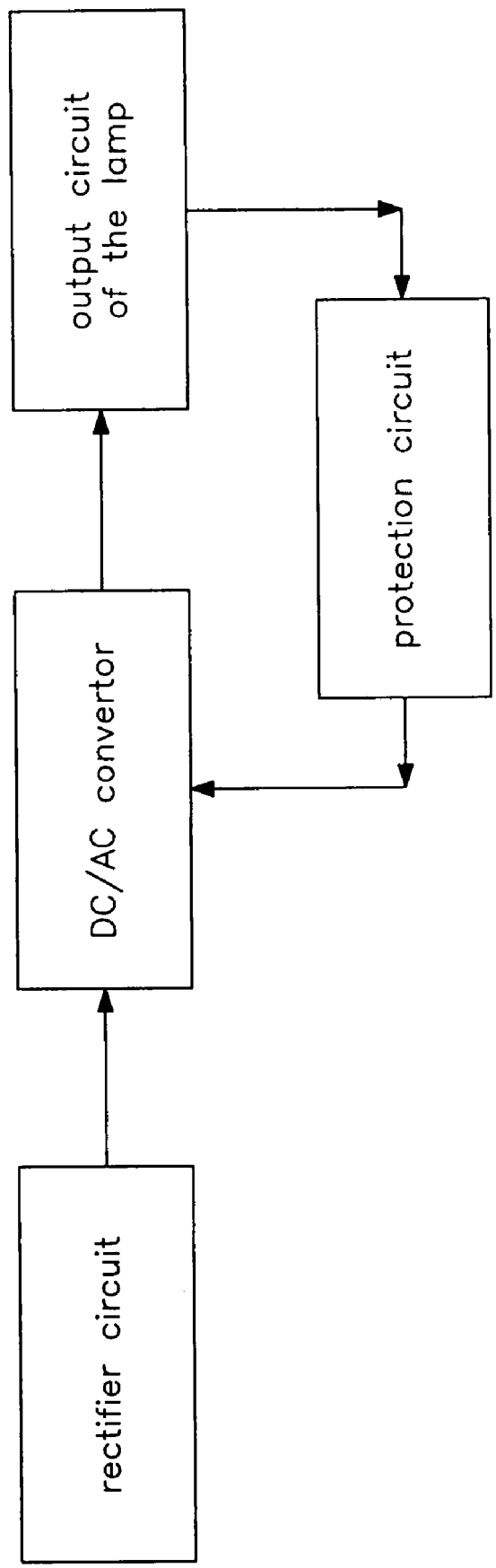
FIG. 1 is a block diagram of an electronic ballast.

FIG. 1 shows a block diagram of an electronic ballast. It consists of a rectifier circuit, a DC/AC convertor, an output circuit of the lamp and a protection circuit. Said DC/AC convertor includes an inner trigger circuit used for start trigger to the DC/AC convertor. Said protection circuit is connected between the DC/AC convertor and the output circuit of the lamp, and makes the lamp tube stop oscillating when abnormality occurs.

Figure 2:
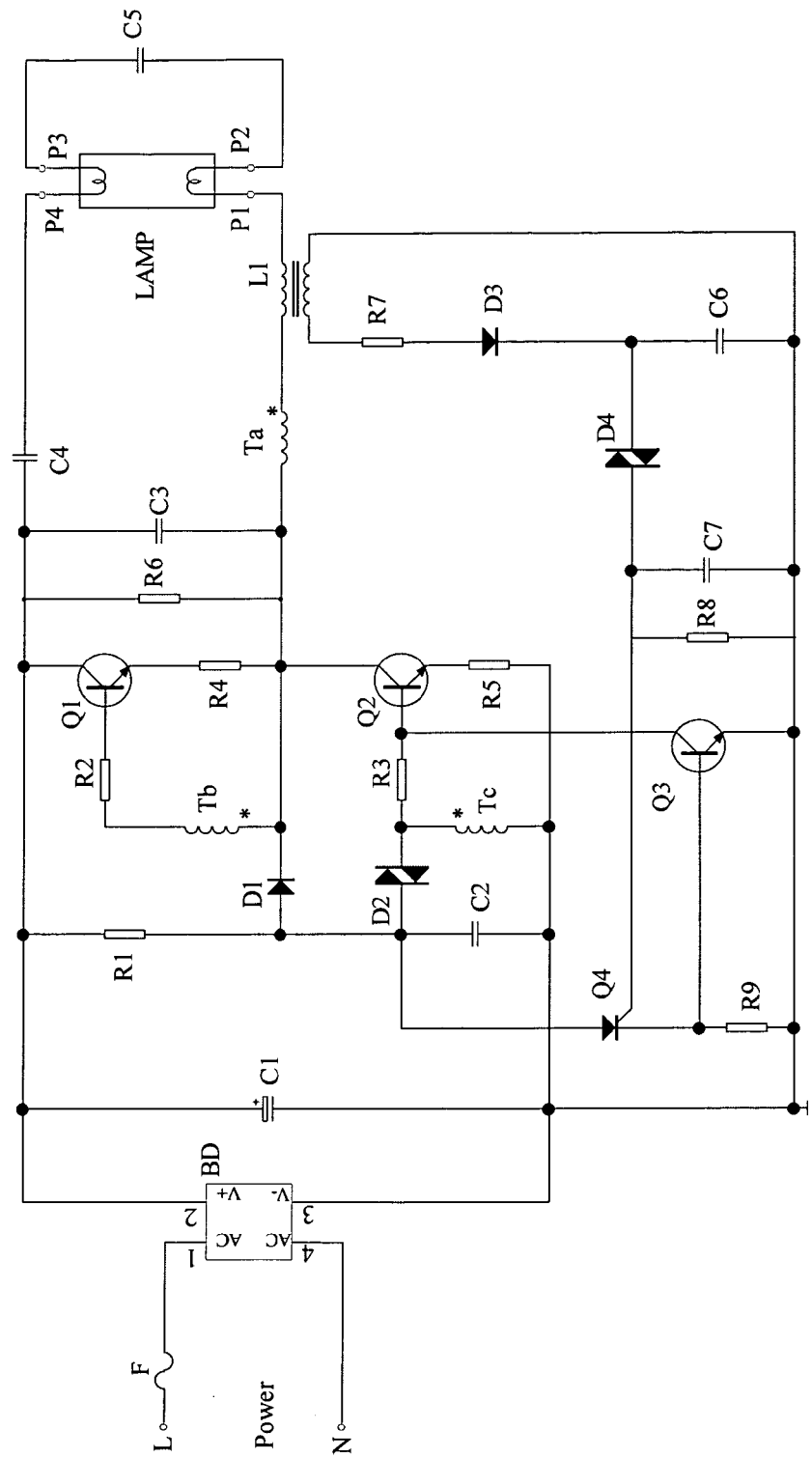
FIG. 2 is a schematic diagram of an existing electronic ballast.

FIG. 2 shows a schematic diagram of an existing electronic ballast. It also includes a rectifier circuit, a DC/AC convertor, an output circuit of the lamp and a protection circuit. It is limited in practical application because it adopts the meaning of continuous trigger and the protection circuit without automatic start, which is mentioned above and is unnecessary to repeat.

Figure 3:
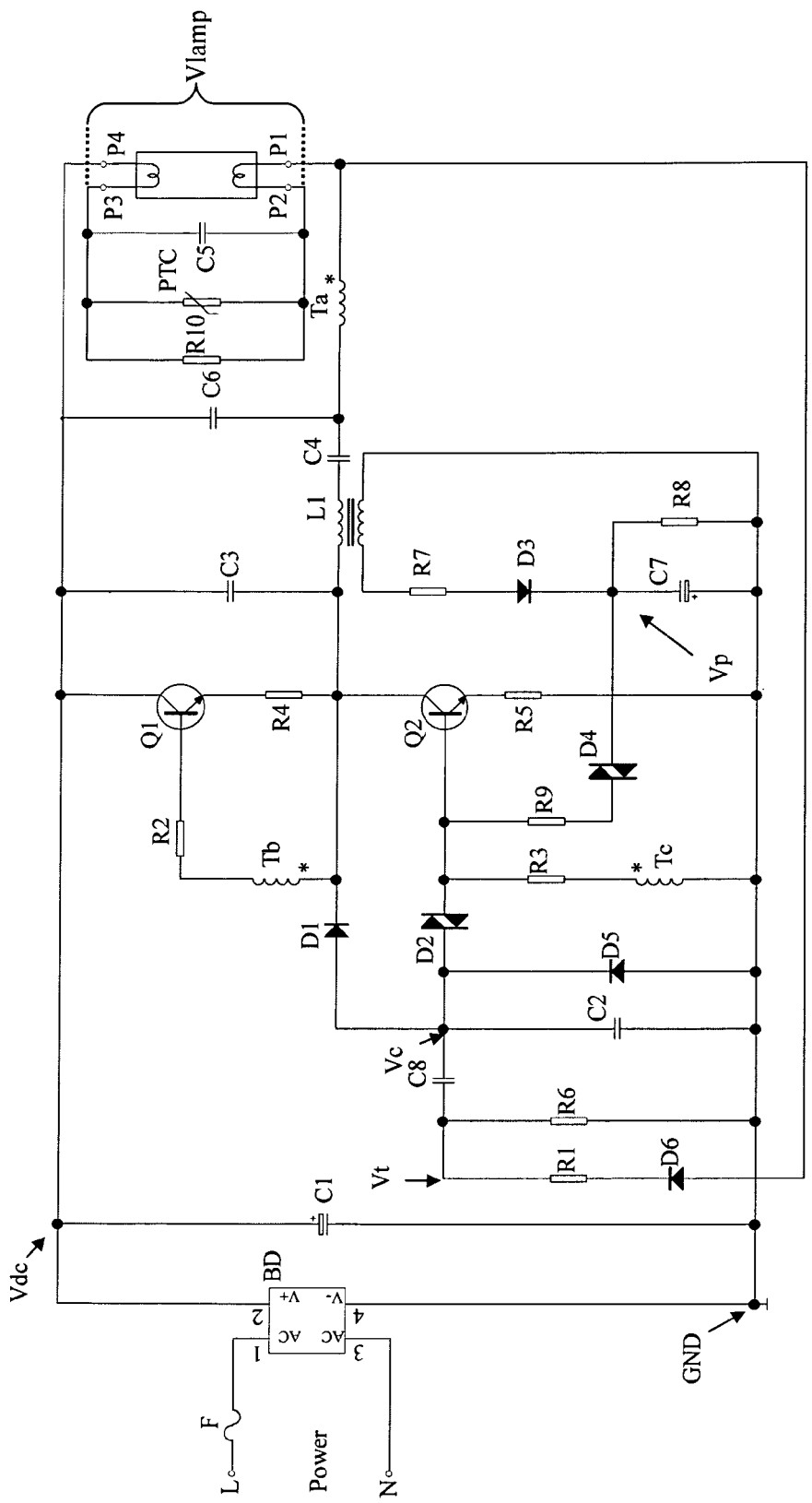
FIG. 3 is a schematic diagram of an electronic ballast with capability of automatic restart of the present invention.
Figure 4:
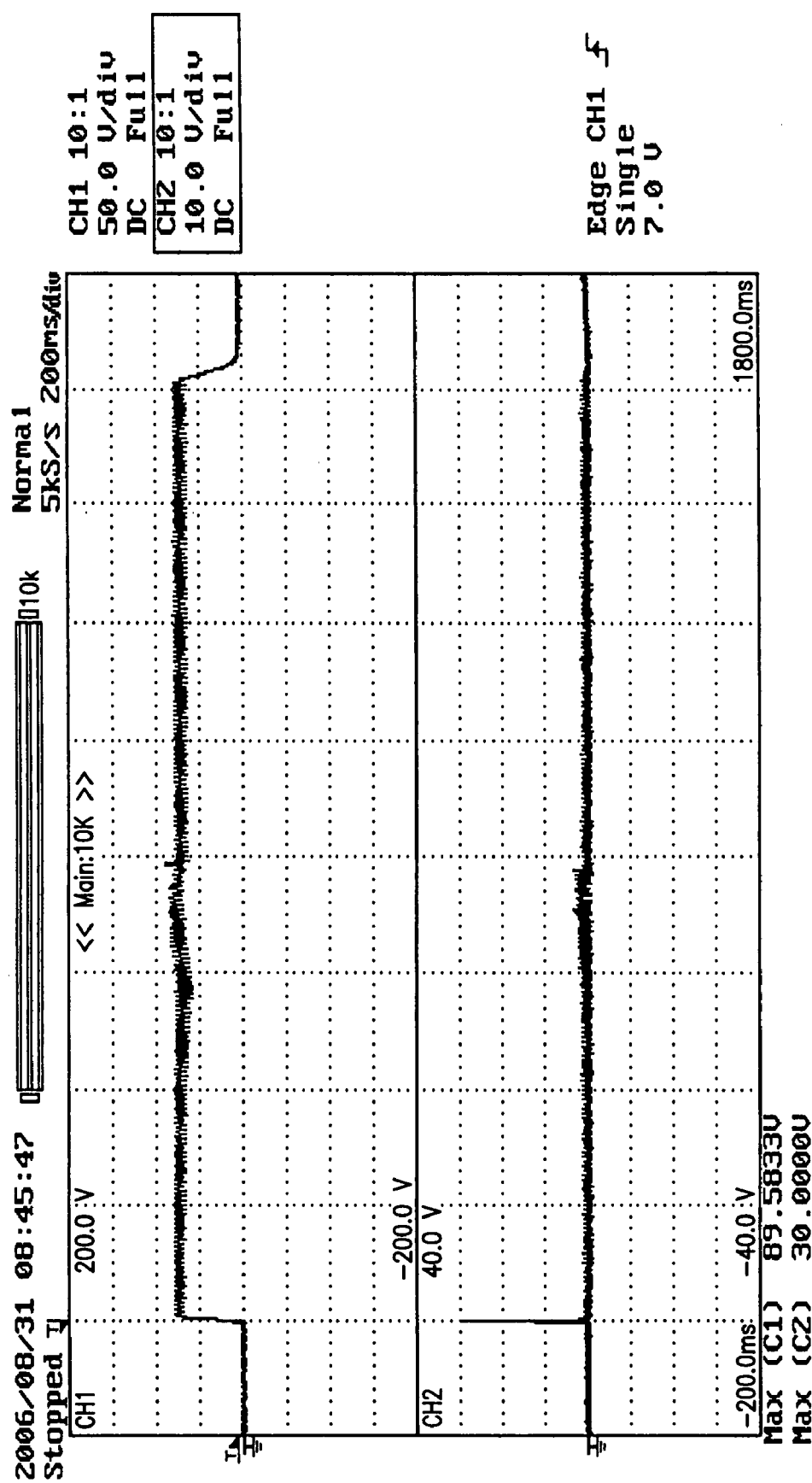
FIG. 4 is a wave-form diagram of trigger source Vt and a wave-form diagram of single-wave trigger signal Vc of the present invention from switching on the power source to steady state further to turning off the power source.
Figure 5:
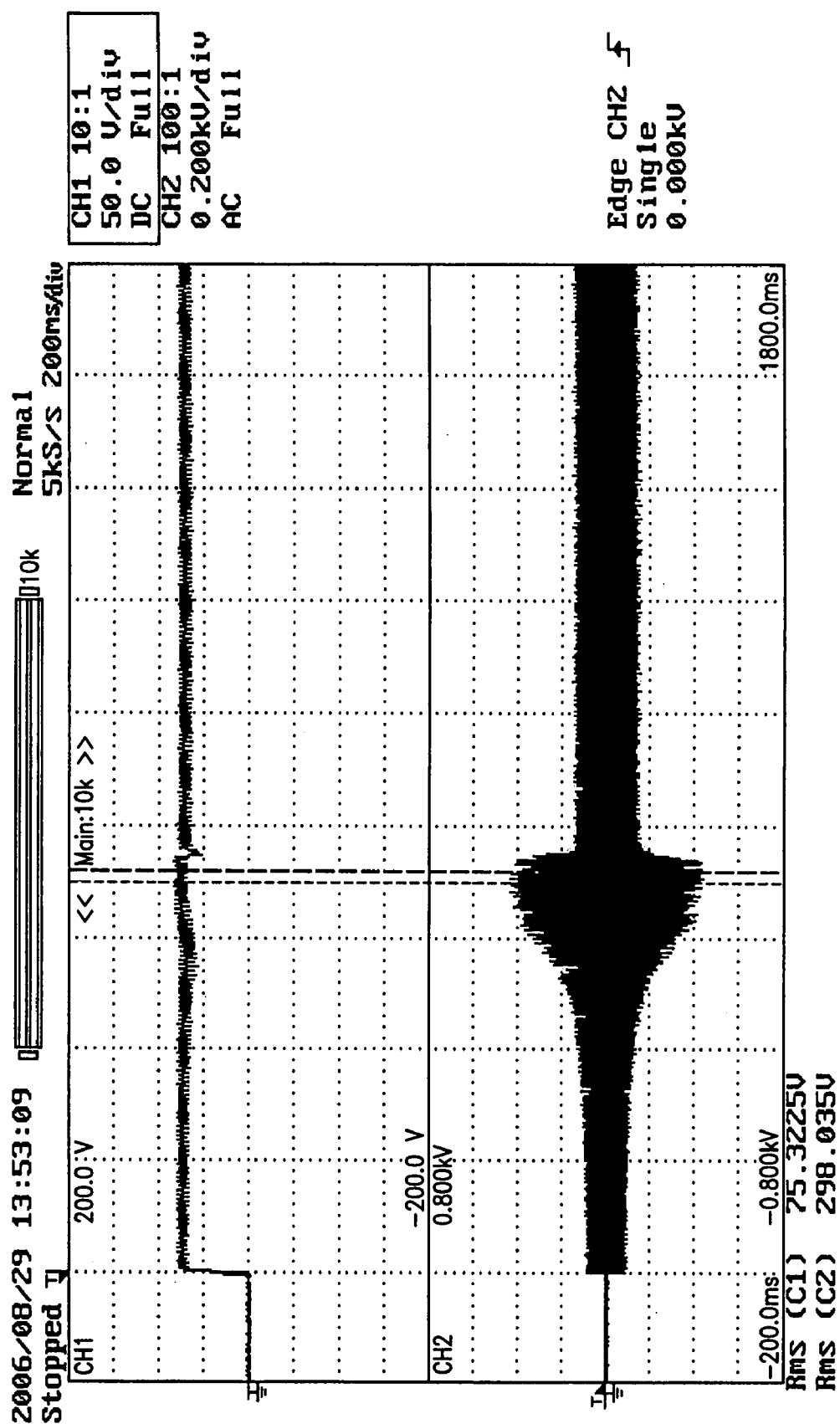
FIG. 5 is a wave-form diagram of trigger source Vt and a wave-form diagram of lamp voltage Vlamp of the present invention from switching on the power source to steady state.
Figure 6:
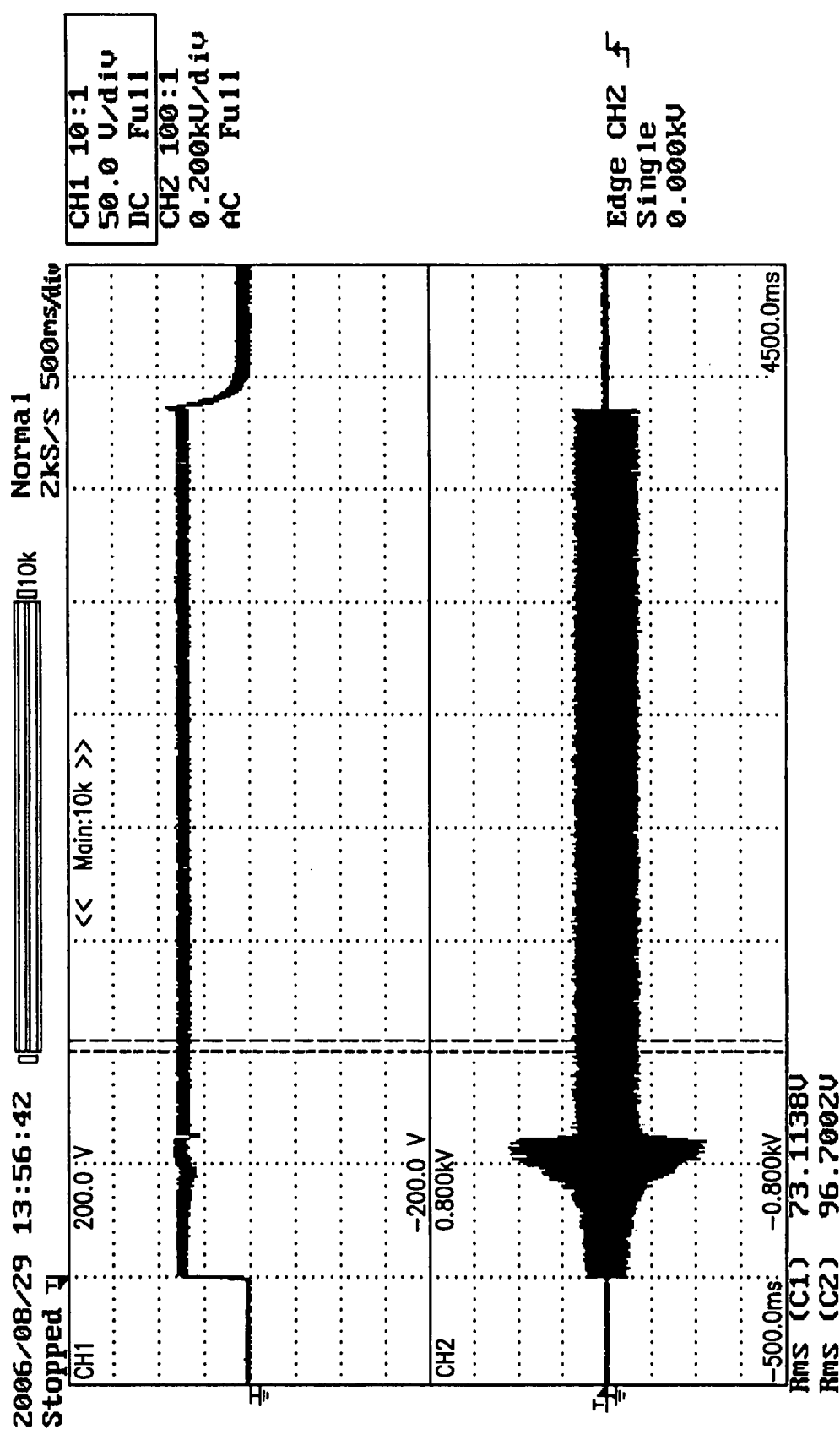
FIG. 6 is a wave-form diagram of trigger source Vt and a wave-form diagram of lamp voltage Vlamp of the present invention from switching on the power source to steady state further to the lamp in open circuit.

FIG. 3 shows a schematic diagram of an electronic ballast with capability of automatic restart of the present invention. It includes a fuse F, a rectifier BD, a filter capacitor C1, two transistors Q1 and Q2, a dv/dt divider C3, a by-pass capacitor C6, three divider resistances R10, R1 and R6, a relax diode D5, two divider capacitors C8 and C2, an oscillating coil T, a relax resistance R8, a delay capacitor C7, an output inductance L1, two rectifier diodes D3 and D6, two diac D2 and D4, a catching diode D4, four current limiting resistances R2, R3, R7 and R9, two negative feedback resistances R4 and R5, a feed-through capacitor C4, a resonant capacitor C5 and a thermistor PTC.

A first end of said fuse F is connected to a live wire F of a power source and a second end of the fuse is connected to a AC end of rectifier BD, a second AC end of the rectifier BD is connected to a neutral wire N of the power source; the positive pole Vdc of DC end of the rectifier BD is connected to the positive pole of the filter capacitor, the collector of transistor Q1, a first end of dv/dt capacitor C3, a first end of by-pass capacitor C6 and a pin P4 of the lamp tube; the negative pole of DC end of rectifier BD is connected to the negative pole of filter capacitor C1, a first end of divider resistance R6, the positive pole of relax diode D5, a first end of divider capacitor C2, no-dot end of the secondary side winding Tc of oscillating coil T, a first end of negative feedback resistance R5, a first end of relax resistance R8, a positive pole of delay capacitor C7 and a first end of a secondary side winding of output inductance L1; the pin P1 of the lamp tube is connected to a dot end of primary side winding Ta of oscillating coil T and a positive pole of rectifier diode D6; a negative pole of rectifier diode D6 is connected to a first end of divider resistance R1; a second end of divider resistance R1 is connected to a second end of divider resistance R6 and a first end of divider capacitor C8; a second end of divider capacitor C8 is connected to a negative pole of relax diode D5, a second end of divider capacitor C2, a first end of diac D2 and a positive pole of catching diode D1; a second end of diac D2 is connected to a base of transistor Q2, a first end of current limiting resistance R3 and a first end of current limiting resistance R9; a second end of current limiting resistance R3 is connected to a dot end of a secondary side winding Tc of oscillating coil T; a base of transistor Q1 is connected to a first end of current limiting resistance R2; a second end of current limiting resistance R2 is connected to a no-dot end of a secondary side winding Tb of oscillating coil T; a dot end of the secondary side winding Tb of oscillating coil T is connected to a negative pole of catching diode D1, a collector of transistor Q2, a second end of dv/dt capacitor C3, a first end of primary side winding of output inductance L1, and a first end of negative feedback resistance R4; a second end of negative feedback resistance R4 is connected to a emitter of transistor Q1; a emitter of transistor Q2 is connected to a second end of negative feedback resistance R5; a second end of current limiting resistance R9 is connected to a first end of diac D4; a second end of diac D4 is connected to a second end of relax resistance R8, a negative pole of delay capacitor C7 and a positive pole of rectifier diode D3; a negative pole of rectifier diode D3 is connected to a first end of current limiting resistance R7; a second end of current limiting resistance R7 is connected to a second end of secondary side winding of output inductance L1; a second end of primary side winding of output inductance L1 is connected to a first end of feed-through capacitor C4; a second end of feed-through capacitor C4 is connected to a second end of by-pass capacitor C6 and a no-dot end of primary side winding Ta of oscillating coil; a pin P2 of the lamp tube is connected to a first end of resonant capacitor C5, a first end of divider resistance R10 and PTC; a second end of resonant capacitor C5, a second end of divider resistance R10 and a second end of PTC is together connected to a pin P3 of the lamp tub.

The present invention is further described in principle in combination with FIG. 4 to FIG. 11.

As described previously, the circuit of the electronic ballast with the capability of automatic restart of present invention, comprises five parts which include a rectifier circuit, a perfect trigger circuit of automatic restart, a DC/AC convertor, a output circuit of the lamp, a circuit of abnormal protection. The fundamental is:

The rectifier circuit converts AC of power frequency into DC to provide electric power for other parts.

The trigger source Vt is established though the loop of Vdc—lamp tube pin P4—lamp tube pin P3—divider resistance R10—lamp tube pin P2—lamp tube pin P1—rectifier diode D6—divider resistance R1—divider resistance R6—GND. It is brought to bear on a voltage divider consisting of capacitor C8 and C2, produces a single-wave trigger signal Vc (see also FIG. 4) on capacitor C2 and at the same time accomplishes a trigger to said DC/AC convertor while capacitor C8 is far larger than C2 and meanwhile the loop is not broken. The rising edge of Vc is established by the charge loop of Vdc—lamp tube pin P4—lamp tube pin P3—divider resistance R10—lamp tube pin P2—lamp tube pin P1—rectifier diode D6—divider resistance R1 and R6—divider capacitor C8—divider capacitor C2—GND. The falling edge of Vc is established by the charge time of the above-mentioned charge loop. It is also known according to FIG. 4 that when the power source is turned off, Vt will return to zero due to the charge loop in open circuit and the discharge loop including capacitor C8, resistance R6 and diode D5 designed in FIG. 3 of the present invention. Besides, no second trigger pulse occurs on Vc during the whole process from switching on the power source to steady state further to turning off the power source.

Said output circuit of the lamp brings a lamp voltage Vlamp (see also FIG. 5) from high to low to bear on the load, namely fluorescence lamp on top of the trigger. Therefore, the lamp is in the warm-up period. The lamp voltage Vlamp will fall to a steady value after the lamp tube is lighted up, namely the steady period.

The circuit of the electronic ballast with the capability of automatic restart of present invention will immediately stop output towards the fluorescence tube when the lamp tube is in poor contact or in open circuit. That is because in the output circuit of the present invention in FIG. 3, the primary side winding Ta of the oscillating coil T is connected in series in the load loop which will be broken when any of the lamp pins is in poor contact or in open circuit. The primary side winding Ta of the oscillating coil T stops oscillating to enter protection state because of swiftly unconnected to the power source, that namely stops output (see also FIG. 6).

Figure 7:
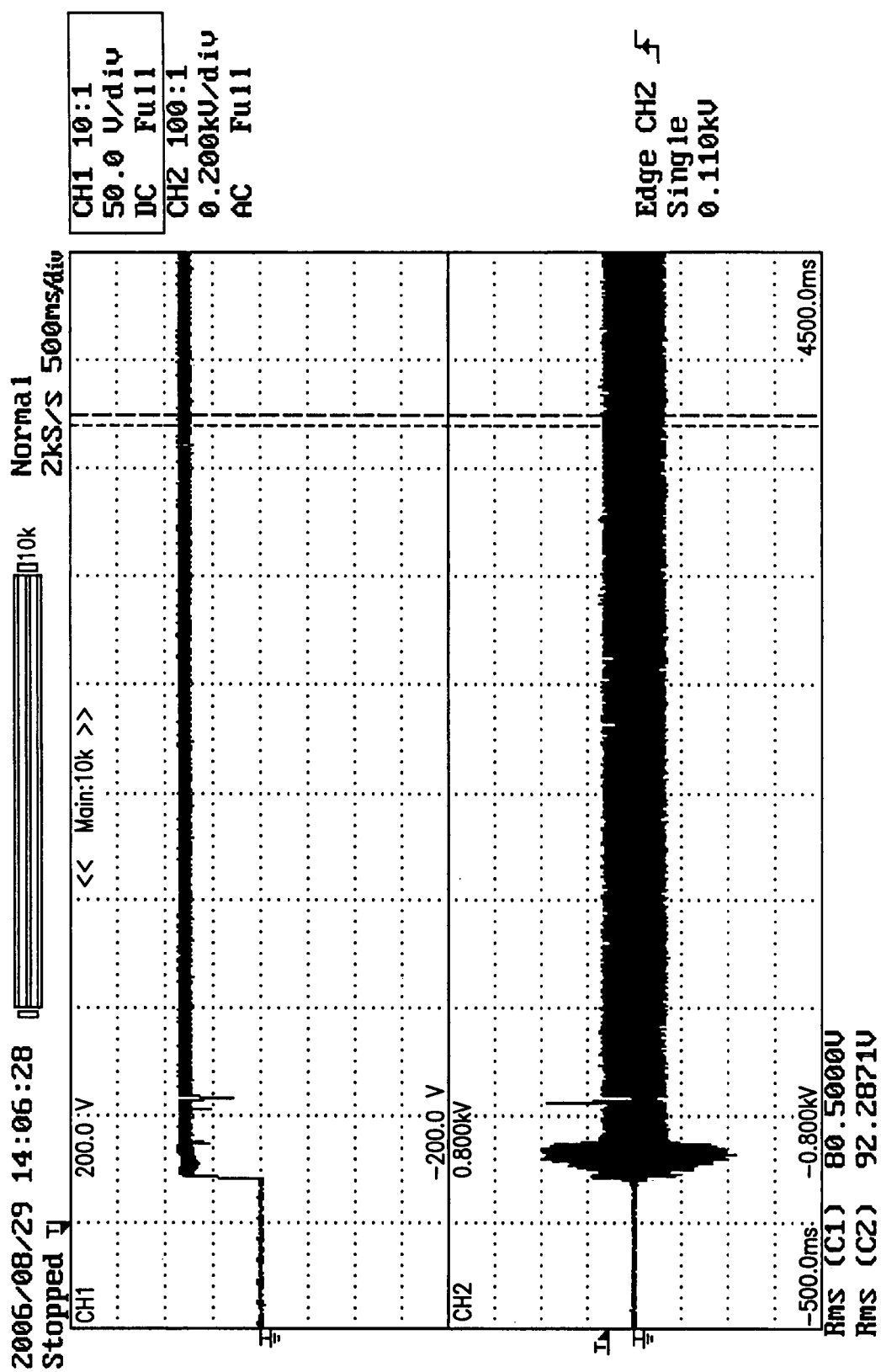
FIG. 7 is a wave-form diagram of trigger source Vt and a wave-form diagram of lamp voltage Vlamp of the present invention from the lamp in open circuit to change of good lamp tube.

FIG. 7 is an observational wave-form showing the automatic restart function after changing the lamp. It can be known from the wave-form of the lamp in open circuit according to FIG. 6 that the trigger source Vt returns to zero, meanwhile the output circuit of the lamp has already stopped output. Because the charge loop including said divider capacitor C8 is open, it will be established to automatically trigger the DC/AC convertor to oscillate and the output circuit to work to light up the fluorescence when the lamp is connected again.

Figure 8:
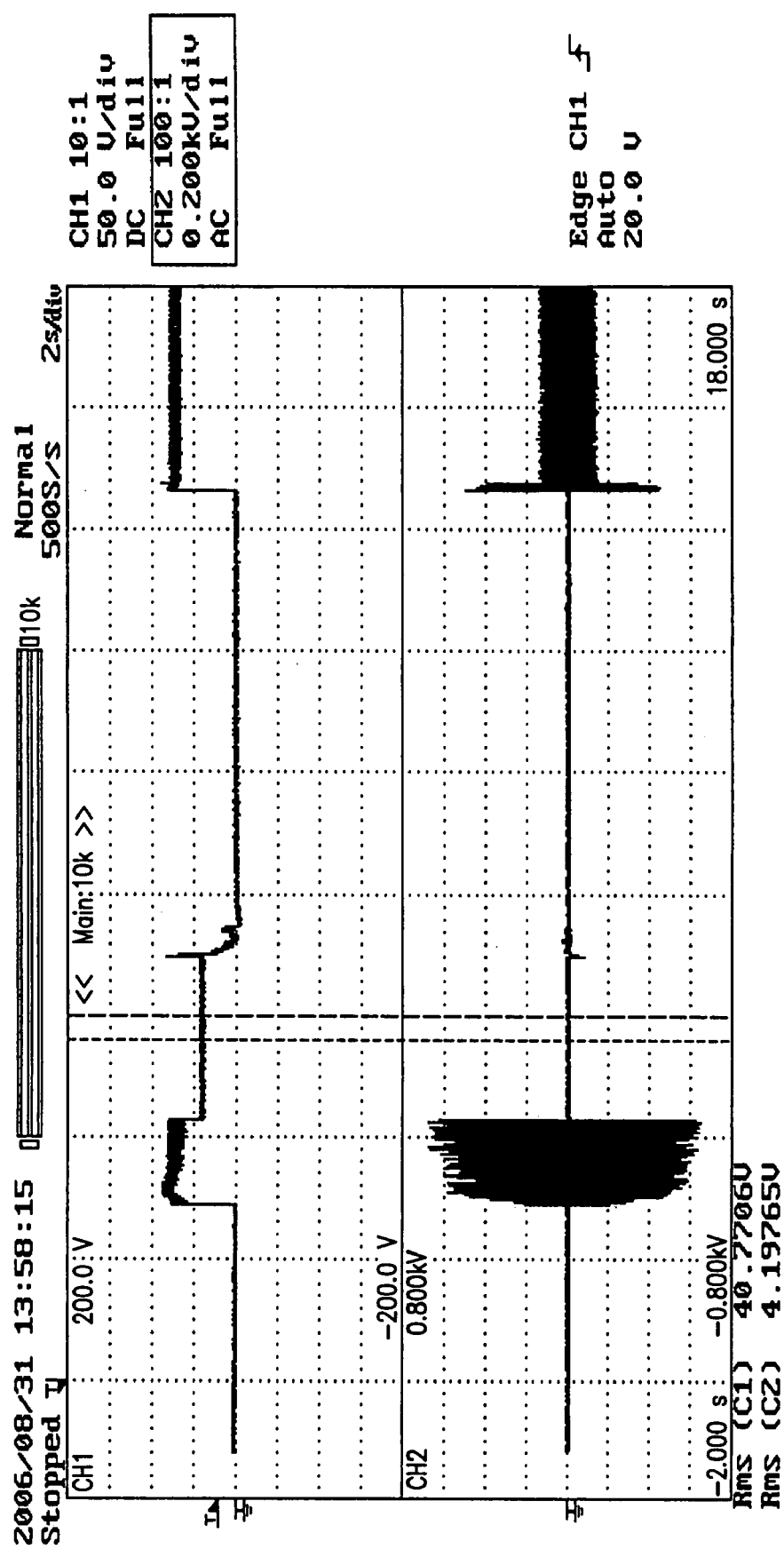
FIG. 8 is a wave-form diagram of trigger source Vt and a wave-form diagram of lamp voltage Vlamp of the present invention from switching on the power source to abnormal protection further to automatic restart.

FIG. 8 is an observational wave-form of trigger source Vt and lamp voltage Vlamp showing the lamp from abnormal protection to automatic restart. It also shows the whole process from start to warm-up, abnormal protection, wiping off the fault lamp tube, renewal of the lamp tube, and finally to automatic restart. After the power source is switched on, a trigger source is immediately established on the double end of resistance R6, and its rising edge produces a synchronous single-wave trigger signal Vc (see also FIG. 4) to trigger the DC/AC convertor oscillating in high-frequency, further to bring lamp voltage Vlamp bear on the lamp tube through output circuit, that is the start period. Subsequently, the voltage of the double end of the lamp tube changes from high to low, that is the warm-up period. When the lamp tube is abnormal (for example: it leaks, over-voltage or reaches the end of life), the abnormal protection circuit which is a part of the circuit of the present invention shall detect the abnormality of the lamp tube, pass through the secondary side winding of the output inductance L1 and commutate by half-wave, work up an abnormal signal Vp on the delay capacitor C7 (its time constant is determined by current limiting resistance R7 and delay capacitor C7), and feed back the negative voltage to the base of transistor Q2 in the down arm of the DC/AC convertor by current limiting R9 when finally reaching the threshold voltage of diac D4, accordingly stop the output of the lamp voltage (see also FIG. 11), thus enter the period of abnormal protection. It can be known from the wave-form of FIG. 8 and FIG. 11 that the lamp voltage Vlamp here is near zero while the trigger source Vt is maintained at a voltage of about 40V to prevent the divider capacitor C8 from discharging, thus realizes the maintain character of abnormal protection. After removing the fault lamp tube, the loop of said Vdc—lamp pin P4—lamp pin P3—divider resistance R10—lamp pin P2—lamp pin P1—rectifier diode D6—divider resistance R1—divider resistance R6—GND is broken, which results in that while the trigger source Vt is open, the capacitor C8 discharges through the discharge loop of the capacitor C8, the resistance R6 and the diode D5, finally makes Vt return to zero, thus enters the period of removing the fault lamp tube. When connecting the good lamp tube, the loop of said Vdc—lamp pin P4—lamp pin P3—divider resistance R10—lamp pin P2—lamp pin P1—rectifier diode D6—divider resistance R1—divider resistance R6—GND is established again, the rising edge of the trigger source Vt makes capacitor C2 produce a single-wave trigger signal to trigger DC/AC convertor oscillating and the output circuit of the lamp working. Finally, the fluorescence lamp is lighted up, that is the period of renewal of the lamp tube and automatic restart.

Figure 9:
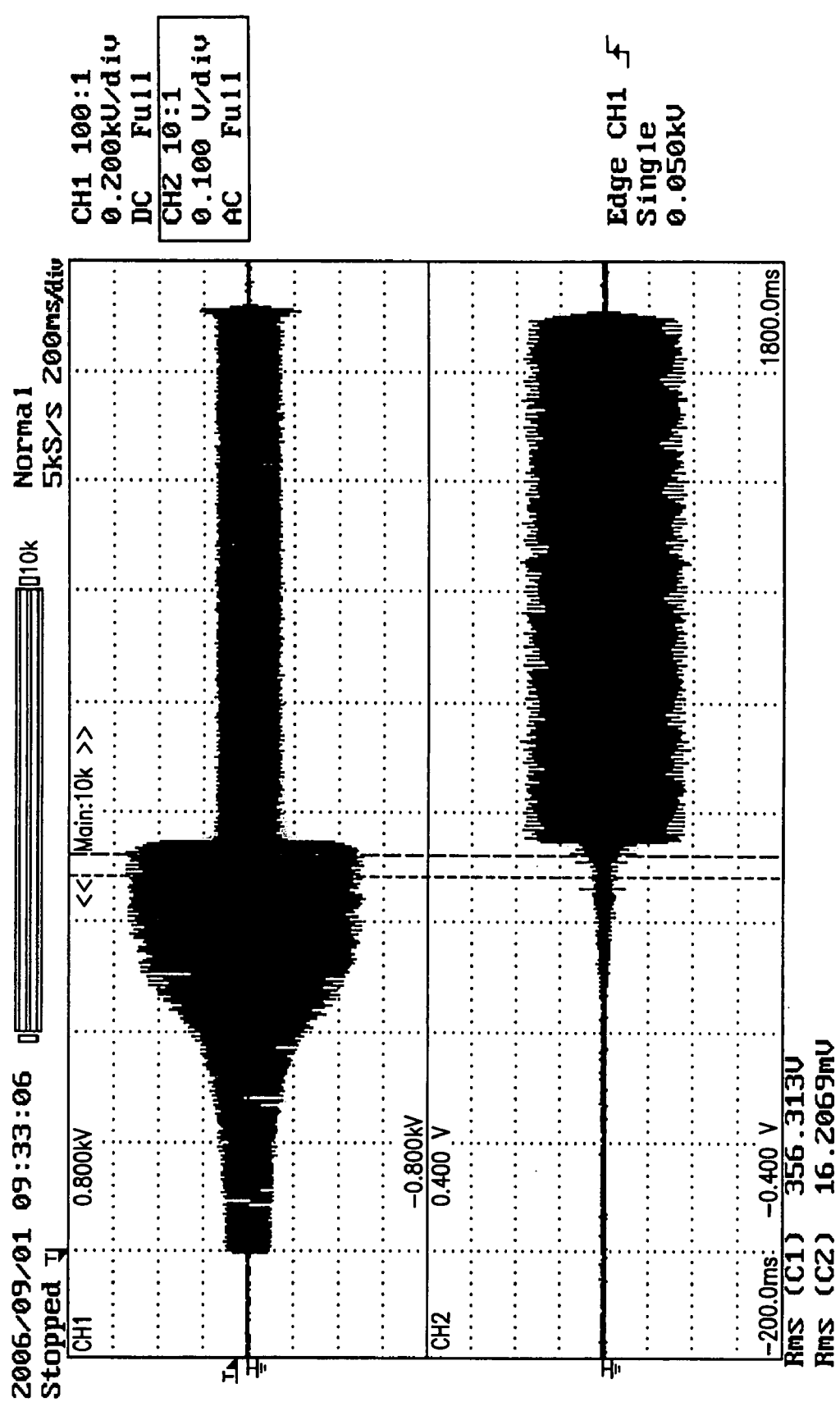
FIG. 9 is a wave-form diagram of lamp voltage Vlamp and a wave-form diagram of lamp current Ilamp when the present invention is warm-up and start.

FIG. 9 is the wave-form of lamp voltage Vlamp and the wave-form of lamp current Ilamp of the present invention under normal condition, from switching on the power source to warm-up and further to lighting up the fluorescence lamp.

Figure 10:
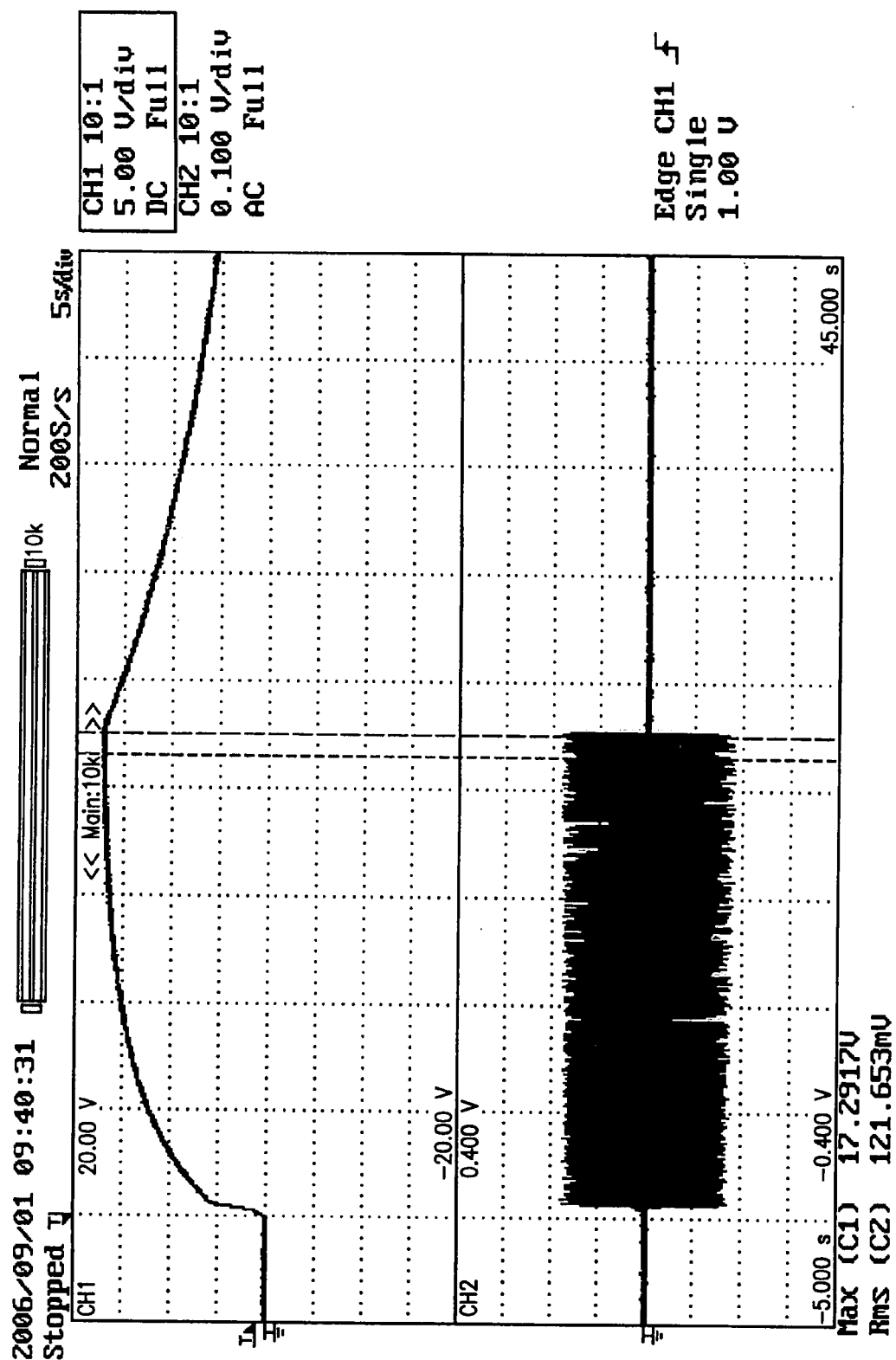
FIG. 10 is a wave-form diagram of protecting voltage Vp and a wave-form diagram of lamp current Ilamp of the present invention from switching on the power source to turning off the power source.
Figure 11:
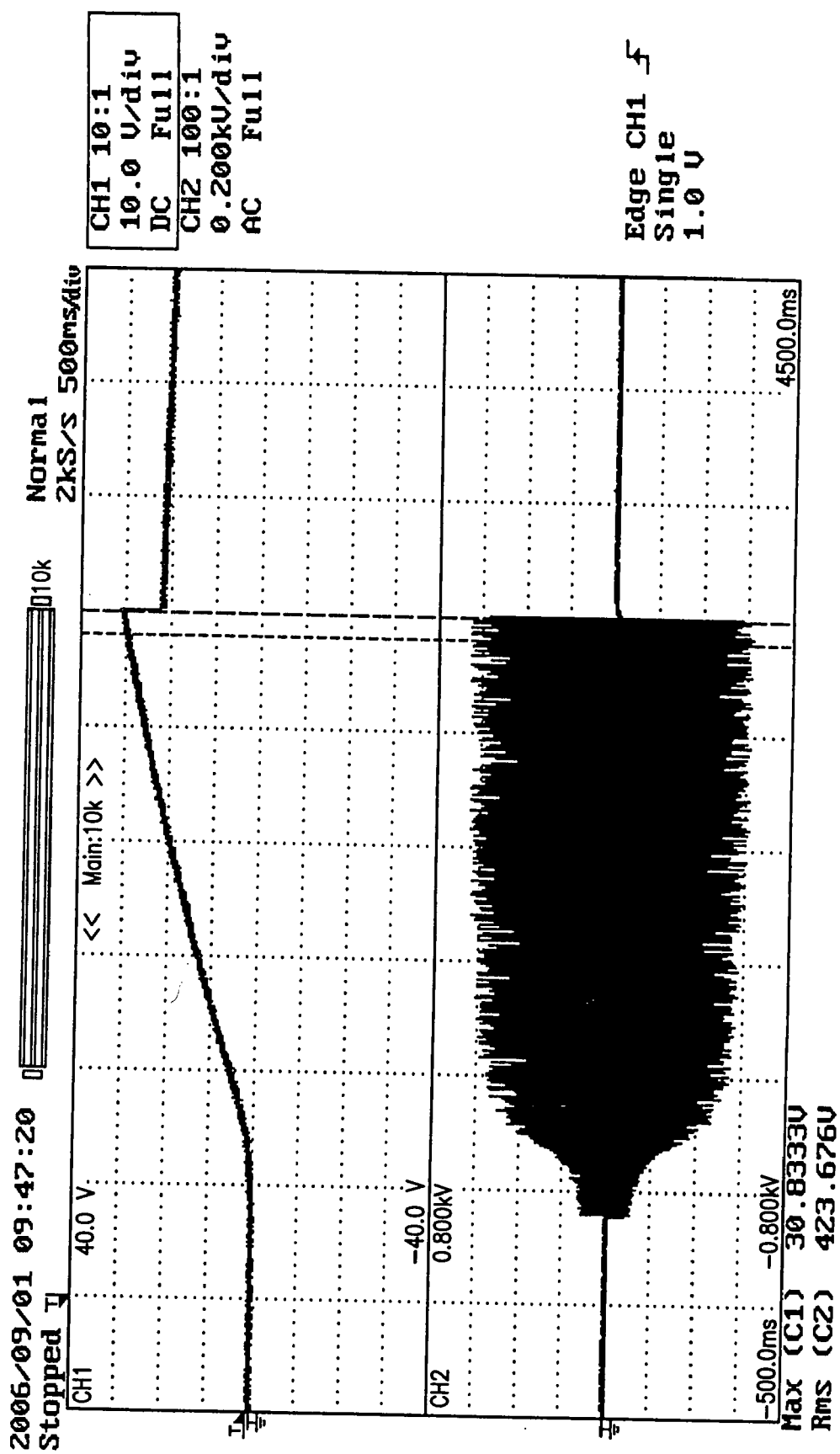
FIG. 11 is a wave-form diagram of protecting voltage Vp and a wave-form diagram of lamp voltage Vlamp of the present invention from switching on the power source to abnormal protection.

FIG. 10 is the wave-form of abnormal signal Vp and the wave-form of lamp current Ilamp of the present invention under normal condition, from switching on the power source to warm-up, further to lighting up the fluorescence lamp, and finally to turning off the power source.

In summary, because the present invention adopts the single-wave trigger circuit, the technology of negative voltage protection with the capability of automatic restart, the solution that the primary side winding Ta of the oscillating coil is connected in series in the loop of the lamp, and the simple half-bridge series resonant circuit, which results in that the cost performance of the complete machine gains a breakthrough elevation. It not only provides a new idea for the miniaturization of the product, but also caters for the goal of international tactic development of energy saving material.

It should be noted that the above-mentioned practice example only describes the present invention, but is not limited to the invention. Any improvement or innovation not exceeding the scope of the substance of the invention shall be deemed as being included in the scope of the present invention.

The invention claimed is:

1. A circuit of an electronic ballast with the capability of automatic restart, comprising a rectifier circuit, a trigger circuit of automatic restart, a DC/AC convertor, a output circuit of a lamp, and a circuit of abnormal protection, wherein there is a discharge loop in said trigger circuit, and a trigger recourse Vt is led out from a lamp loop; wherein said rectifier circuit comprises a fuse F, a rectifier BD and a filter capacitor C1; said DC/AC convertor comprises a catching diode D1, a transistor Q1, a transistor Q2, a current limiting resistance R2, a current limiting resistance R3, a feedback resistance R4, a negative feedback resistance R5, a dv/dt capacitor C3, two secondary side windings Tb and Tc of the oscillating coil T; said trigger circuit of automatic restart comprises a divider resistance R10, a rectifier diode D6, a divider resistance R1, a divider resistance R6, a divider capacitor C8, a relax diode D5, a divider capacitor C2, and a diac D2; said output circuit of the lamp comprises a output inductance L1, feed-through capacitor C4, by-pass capacitor C6, a primary side winding Ta of oscillating coil T, a resonant capacitor C5, and a thermistor PTC; said circuit of abnormal protection comprises a secondary side winding of the output inductance L1, a current limiting resistance R7, a rectifier diode D3, a delay capacitor C7, a relax resistance R8, a diac D4, and a current limiting resistance R9.

2. The circuit according to claim 1, wherein a first end of said fuse is connected to a live wire of a power source and a second end of the fuse is connected to a AC end of rectifier BD, a second AC end of the rectifier BD is connected to a neutral wire of the power source; the positive pole Vdc of DC end of the rectifier BD is connected to the positive pole of the filter capacitor, the collector of transistor Q1, a first end of dv/dt capacitor C3, a first end of by-pass capacitor C6 and a pin P4 of the lamp tube; the negative pole of DC end of rectifier BD is connected to the negative pole of filter capacitor C1, a first end of divider resistance R6, the positive pole of relax diode D5, a first end of divider capacitor C2, no-dot end of the secondary side winding Tc of oscillating coil T, a first end of negative feedback resistance R5, a first end of relax resistance R8, a positive pole of delay capacitor C7 and a first end of a secondary side winding of output inductance L1; the pin P1 of the lamp tube is connected to a dot end of primary side winding Ta of oscillating coil T and a positive pole of rectifier diode D6; a negative pole of rectifier diode D6 is connected to a first end of divider resistance R1; a second end of divider resistance R1 is connected to a second end of divider resistance R6 and a first end of divider capacitor C8; a second end of divider capacitor C8 is connected to a negative pole of relax diode D5, a second end of divider capacitor C2, a first end of diac D2 and a positive pole of catching diode D1; a second end of diac D2 is connected to a base of transistor Q2, a first end of current limiting resistance R3 and a first end of current limiting resistance R9; a second end of current limiting resistance R3 is connected to a dot end of a secondary side winding Tc of oscillating coil T; a base of transistor Q1 is connected to a first end of current limiting resistance R2; a second end of current limiting resistance R2 is connected to a no-dot end of a secondary side winding Tb of oscillating coil T; a dot end of the secondary side winding Tb of oscillating coil T is connected to a negative pole of catching diode D1, a collector of transistor Q2, a second end of dv/dt capacitor C3, a first end of primary side winding of output inductance L1, and a first end of negative feedback resistance R4; a second end of negative feedback resistance R4 is connected to a emitter of transistor Q1; a emitter of transistor Q2 is connected to a second end of negative feedback resistance R5; a second end of current limiting resistance R9 is connected to a first end of diac D4; a second end of diac D4 is connected to a second end of relax resistance R8, a negative pole of delay capacitor C7 and a positive pole of rectifier diode D3; a negative pole of rectifier diode D3 is connected to a first end of current limiting resistance R7; a second end of current limiting resistance R7 is connected to a second end of secondary side winding of output inductance L1; a second end of primary side winding of output inductance L1 is connected to a first end of feed-through capacitor C4; a second end of feed-through capacitor C4 is connected to a second end of by-pass capacitor C6 and a no-dot end of primary side winding Ta of oscillating coil; a pin P2 of the lamp tube is connected to a first end of resonant capacitor C5, a first end of divider resistance R10 and PTC; a second end of resonant capacitor C5, a second end of divider resistance R10 and a second end of PTC is together connected to a pin P3 of the lamp tub.

3. The circuit according to claim 2, wherein the divider capacitor C8 is far larger than the divider capacitor C2.

\* \* \* \* \*